May 23, 1967 MUTSUHIKO KATORI 3,320,643
INDEPENDENT SWING MOTION APPARATUS FOR FEED
ROLLER IN RECTILINEAR COMBER
Filed Oct. 18, 1965 6 Sheets-Sheet 1

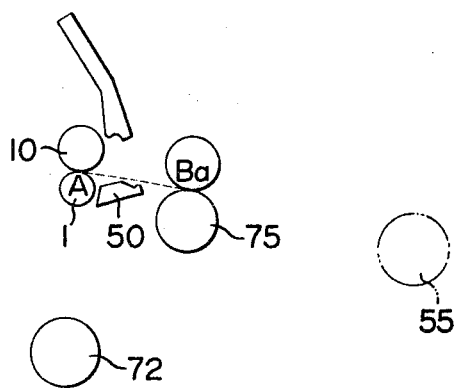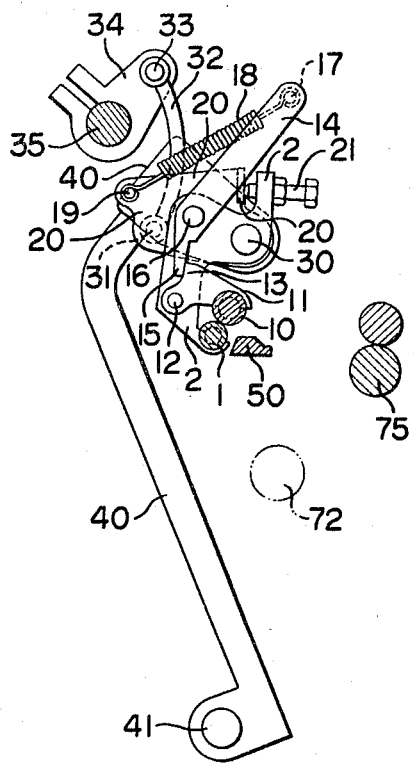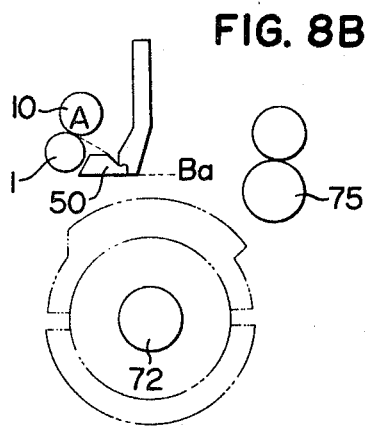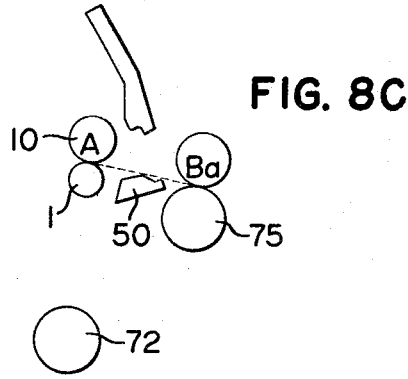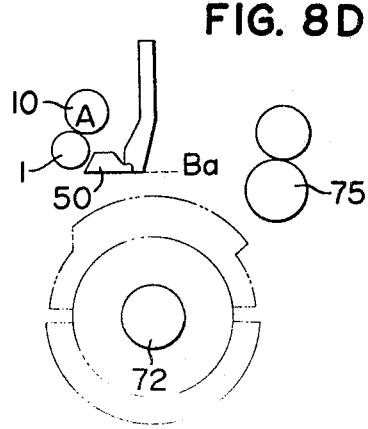

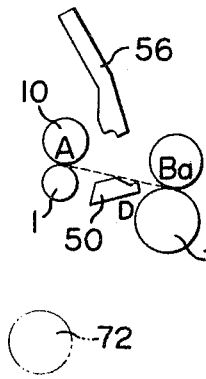
FIG. 9A
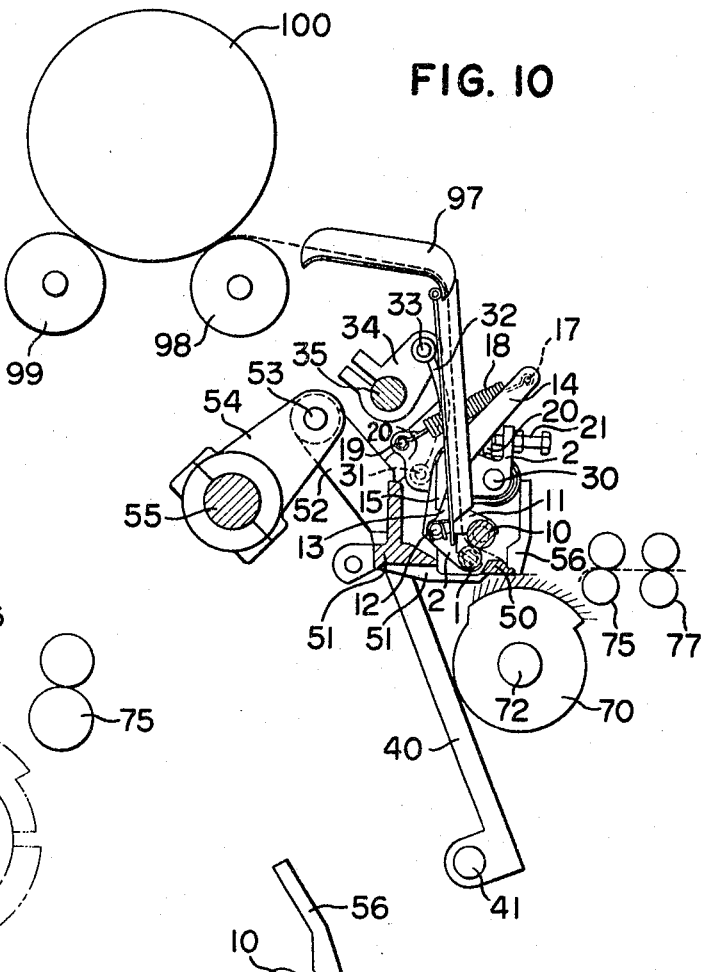
FIG. 10
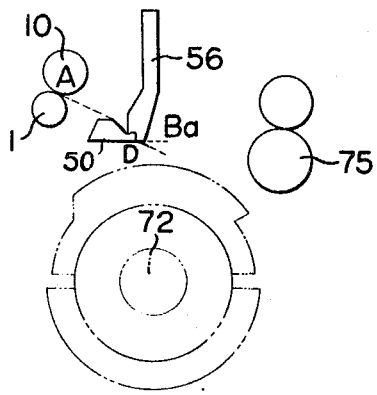
FIG. 9B
FIG. 9C
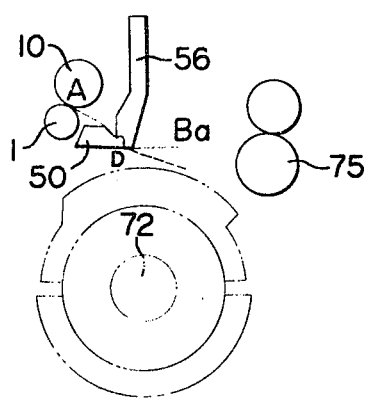
FIG. 9D

United States Patent Office 3,320,643
Patented May 23, 1967

3,320,643
INDEPENDENT SWING MOTION APPARATUS FOR FEED ROLLER IN RECTILINEAR COMBER
Mutsuhiko Katori, Nagoya-shi, Japan, assignor to Howa Kogyo Kabushiki Kaisha, Nagoya-shi, Japan
Filed Oct. 18, 1965, Ser. No. 497,402
Claims priority, application Japan, May 7, 1962, 37/17,692
3 Claims. (Cl. 19—225)

This application is a continuation-in-part of application Ser. No. 276,724 filed on Apr. 30, 1963, now abandoned in the name of Mutsuhiko Katori, and entitled, Independent Swing Motion Apparatus for Feed Roller in Rectilinear Comber.

This invention relates to cotton combers, and more particularly to a new independent swing motion apparatus for feed rollers in rectilinear combers.

The main function of a combing machine is to remove fibers of short length from a fiber group matt (fleece), which are one of the factors for lowering yarn quality grade.

The main part of this function is accomplished by the removal of short fibers from the fiber group matt by the combing action of a group of needles within such matt, and which is embedded in the half lap. Apart from this action, the needles of the top comb operate in a secondary manner to assist the above action. The amount of short fibers to be removed, or the length thereof, the rate of removal of other heterogeneous matters varies dependent on the working conditions of the needles of the half lap and the top comb on the fiber group matt. Accordingly, it is required in a comber that the amount to be removed away as waste, in other words, the waste percentage be adjustable to any desired degree.

The superiority or inferiority of the function or mechanism of a comber is judged in accordance with the degree for its capacity of removing such short fibers or heterogeneous matters and its capability for adjusting the waste percentage in a wide range. Improvement of combers has been directed toward means to obtain higher rates of fiber removal, namely, minimizing the amount of short fiber remaining in fleece and, moreover, obtaining a mechanism capable of making waste removal percentage as low as possible so that combed yarn of desired quality is obtainable over a wide range.

Generally, in any mechanism of like type, the space of the center distance between the back detaching roller and the feed roller of the combing head at the front dead point to which the combing head progresses should be longer than the maximum length of fiber to be treated. As a matter of common sense, it is necessary that the top comb works effectively between the back detaching roller and the front edge of the cushion plate, and, for this purpose, a space of a certain amount is naturally required at this point. In collective consideration of the aforesaid requirements and also of the diameter of the back detaching roller, there should be a limit to the space between the nip point of the back detaching roller and the front edge of the cushion plate.

In the conventional system, the distance to the feed roller from the front edge of the cushion plate at the front dead point is not adjustable. Therefore, it is impossible to adjust independently the space of the center distance between the back detaching roller and the feed roller and the space between the back detaching roller and the front edge of the cushion plate. The length of the tuft projecting from the front edge of the cushion plate and the nipper knife, during the cylinder combing action, should not be longer than the maximum length of short fibers to be removed. In the conventional system, also, the distance between the feed roller and the front edge of the cushion plate at the time of nipper closing is not adjustable with the consequence that it is impossible to adjust in a wide range the length of the tuft projecting from the front edge of the cushion plate. For these reasons, the minimum waste percentage obtainable in the hitherto existing combing machines is considered to be approximately 8%.

A unique feature of this invention lies in the adoption of a system in which the feed roller is supported by the feed roller bracket independent of the cushion plate and in which both the feed roller bracket and the nipper body, including the cushion plate, can swing around a common center independently, and also in a mechanism which enables the selection simultaneously and independently of a desired swing amount of the feed roller and of the cushion plate so as to obtain a desired amount of the aforesaid respective spaces.

In this invention, the aforesaid three factors, that is to say, the space between the back detaching roller and the front edge of the cushion plate; the space between the back detaching roller and the feed roller at front dead point; and the length of the tuft projecting from the front edge of the cushion plate and the nipper knife during the cylinder combing action, are all adjustable independently and perfectly. Consequently, it is the characteristic of the present invention that the production of comber sliver can be achieved for the first time with waste percentage as low as 3%.

In the conventional cotton combers, the feeding of the lap is induced by swinging or reciprocating motion of the nipper body or by the relative linear movement of the feed roller bracket against the cushion plate. In this invention, however the feeding of the lap is induced by swinging of the feed roller bracket per se which is independent of the cushion plate. Also the purpose of the relative movement of the feed roller bracket against the cushion plate is quite different from the conventional combers. More specifically in the conventional combers, it was to induce the lap feeding; whereas, in the present invention, it is to change the relative position of the feed roller against the cushion plate.

This invention, with these features, as compared with a conventional mechanism, provides a very unique swing mechanism for the combing head.

The nature, principle, and details of the invention will become more apparent by reference to the following detailed description of a preferred embodiment of the invention when it is read in conjunction with the accompanying drawings in which like parts are designated by like reference numerals and letters and in which:

FIG. 5 is an elevational view showing only the feed roller swing mechanism in the normal operating condition;

Figure 1:
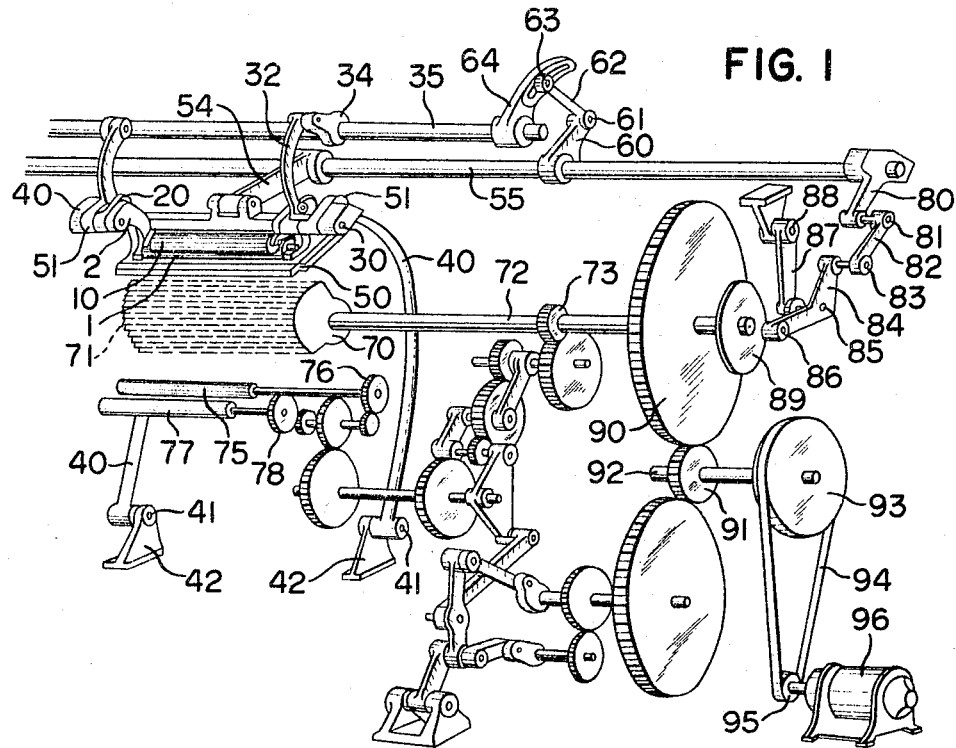
FIG. 1 is a perspective view showing a power transmission arrangement for driving the combing head.
Figure 3C:
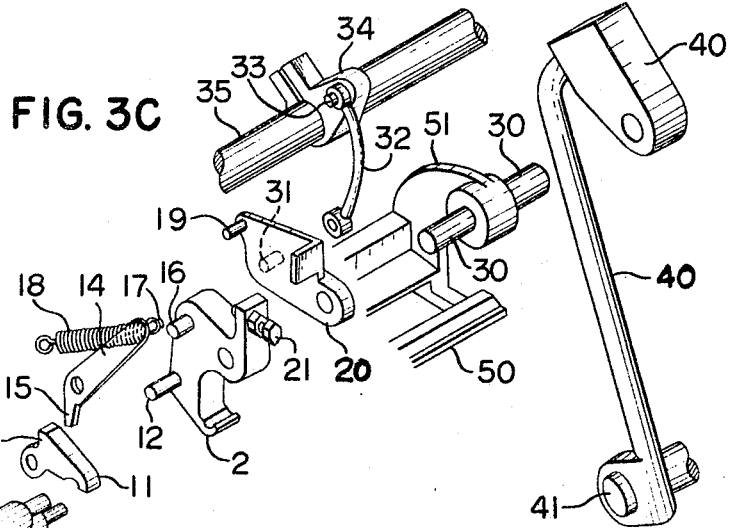
FIG. 3C is an exploded view of various elements which are included in FIG. 2.

FIGS. 8A, 8B, 8C and 8D are respectively elevational views indicating settings for obtaining the same waste percentage, in which FIGS. 8A and 8B illustrate the case which is almost equivalent to that of conventional mechanisms, and whereas in the case of FIG. 8C, the cushion plate is much closer to the detaching roller, the center distance of the detaching roller and the feed roller being exactly equal in the case of FIGS. 8A and 8C in which the swing of the cushion plate is greater than that of the feed roller;

FIGS. 9A, 9B, 9C and 9D are respectively elevational views indicating settings for obtaining the different waste percentages in the case of treatting the same fibers; and FIG. 10 is an elevational view showing the state wherein the cylinder combing operation at the rear dead point of the combing head is performed.

The construction of a combing machine generally consists of the following three units: (1) one group which is formed, as one unit, by the feeding assembly for the combing stock (fiber matt) and apparatus for nipping the fiber matt during combing motion; (2) a cylinder which combs away the fiber matt by means of a needle group on a half lap; and (3) a detaching roller mechanism which draws away a large number of fibers sufficiently combed in the fiber fleece until the nipper and feed mechanism reach the front dead point from a midway point of forward swing. Besides these units, there is provided a gear transmission which induces the interrelated motions of the aforesaid three units (usually a cam mechanism is employed for this transmission, but FIG. 1 illustrates unique gear and link arrangements in which a cam mechanism is not used).

Referring to FIG. 10, a pair of lap rollers 98 and 99, on which a lap roll 100 of the fleece to be combed rests, revolve slowly to feed the fleece to feed rollers 1 and 10 and then to a cushion plate 50 and a nipper knife 56. The lap of the fleece is nipped between the feed rollers 1 and 10 as well as between the cushion plate 50 and the nipper knife 56. In the present invention, the space between the feed rollers 1 and 10 and the cushion plate 50 is adjustable, so that the length of the tuft is also adjustable by adjusting the relative position of the feed rollers 1 and 10 with respect to the cushion plate 50. Even if the space between the feed rollers 1 and 10 and the cushion plate 50 has been adjusted at the rear dead point, it can still be adjusted, at the front dead point.

Now, referring to FIG. 1, a combing machine possessing six or eight heads is generally driven by one motor 96, which drives a driving pulley 93 through a motor pulley 95 and a V-belt 94, thereby causing a main counter-shaft 92 to rotate. The rotation of a gear 91 mounted on the main counter-shaft 92 is transmitted through a large cylinder gear 90 to a cylinder shaft 72.

This cylinder shaft 72 rotates a cylinder 70 having a half flap 71 and simultaneously transmits to detaching rollers 75 and 77 such specific rotating condition as is anticipated to be induced by the combination of motions which is produced by the gear train (as shown in the drawing) of a gear 73 mounted on the cylinder shaft 72 and another gear train and link mechanism of a gear 91 mounted on the counter-shaft 92 through detaching roller gears 76 and 78 mounted on the respective detaching roller shafts, and thus effects detaching motion without using any cam mechanism.

Fixed to nipper actuating shaft 55 is an arm 80 which is pivotally connected by pin 81 to a link 82 which in turn is pivotally connected by a pin 83 to one arm of a bell-crank lever 84. The bell-crank lever 84 is pivotally mounted on a pin 85 carried by a link 87 which in turn is pivotally mounted on a fixed structure by a pin 88. The opposite end of the bell-crank lever 84 is pivotally connected to a crank pin 86 carried by a disk 89 fixed at one extreme end of the cylinder shaft 72. As a result, rotation of the cylinder shaft 72 causes the nipper actuating shaft 55 to oscillate rotationally and such motion is a particular means for oscillating the nipper actuating shaft 55.

As illustrated in FIGS. 1, 2, 3A, 3B and 3C, the swing motion toward the front and back of nipper is induced by the oscillating angular movement of the nipper actuating shaft 55. That is, the nipper body 51 is provided with both front and back supporting points and at the back supporting point, the body is held by a nipper oscillating arm 54 which is mounted on the nipper actuating shaft 55 by being pin-jointed by pin 53 with the holder arm 52 which is an integral part of the nipper body 51. The nipper body 51 is, at its supporting point, pin-jointed by pin 30 with the top part of the nipper swing arm 40, the bottom of which is supported by a pin 41 on a bracket 42 mounted on the frame construction. Clearly, the pin 30 swings back and forth along the locus of an arc whose center is the pin 41, and its forward and backward swing motion is induced by the connection of the nipper oscillating arm 54, pin 53, holder arm 52, nipper body 51 and pin 30 due to the oscillating movement of the nipper actuating shaft 5. A cushion plate 50 is the front part of the nipper body 51.

An intermediate feed roller bracket 20 is supported, at its back, through a pin 31, which is built-in in the intermediate feed roller bracket 20, by a connecting arm 32 connected to a feed roller oscillating arm 34 which is further mounted on feed roller actuating shaft 35 through a pin 33, and, at its front, is mounted on the pin 30. A feed roller bracket 2 is mounted on the pin 30, which also supports the intermediate feed roller bracket 20 and the nipper body 51 separately. A spring lever 14 is mounted pivotally on a pin 16, which is built-in the feed roller bracket 2. Bottom end 15 of the spring lever touches a top feed roller bracket 11 which holds a top feed roller 10. A pin 17, which is built-in the top of the spring lever 14, is connected by a spring 18 with a pin 19, which is built-in the rear part of the intermediate feed roller bracket 20. An adjusting screw 21, which is screwed in through the feed roller bracket 2, adjusts the relative position between the intermediate feed roller bracket 20 and the feed roller bracket 2. The spring force combines the intermediate feed roller bracket 20 and the feed roller bracket 2 in one body through the connecting action of the pin 19, spring 18, pin 17, spring lever 14, pin 16, bottom end 15 of the spring lever 14, pin 12, the top feed roller bracket 11, its rear part 13, the top feed roller 10, the bottom feed roller 1 and the adjusting screw 21. Consequently, the feed roller bracket 2 oscillates on the pin 30, as a common center for the nipper body 51, due to the oscillating movement of the feed roller actuating shaft 35.

Means for mounting the cushion plate 50 and the feed roller on the nipper swing arm to make the same move pivotally on the common center of the nipper body 51 has been abovementioned. The nipper body 51 and the feed roller bracket 2 are supported on the same pin 30 for the top of the nipper swing arm 40 and rock forward and backward along the locus of the arc of the pin 30, and are simultaneously oscillated independently on the pin 30 by the respective oscillating movements of the nipper actuating shaft 55 and the feed roller actuating shaft 35. The cushion plate 50 is the front part of the nipper body 51 and the feed rollers and the top feed roller bracket 11 are held by the feed roller bracket 2. Hence the cushion plate 50 and the feed rollers 1 and 10 can swing independently on the same pin 30. This is a unique device of this invention.

Figure 7A:
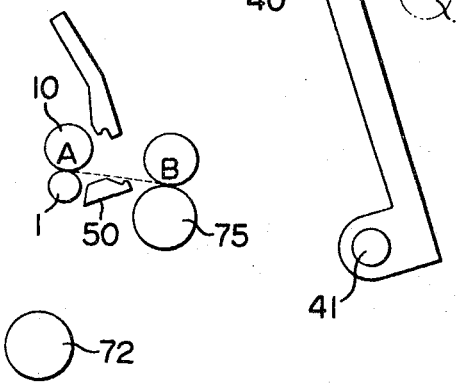
FIGS. 7A and 7B are respectively elevational views indicating the relative positions at the two dead points of the feed roller and the cushion plate for obtaining lower waste percentage, the swing of the feed roller being indicated as being greater than that of the cushion plate.
Figure 7B:
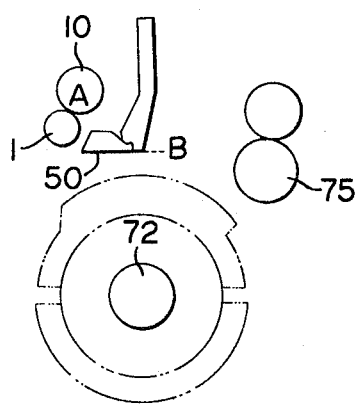

As at result of this arrangement, the feed rollers 1 and 10 are capable of being adjusted and controlled in their relative position as well as the amount of swing amount; and the cushion plate 50 is so designed that when it approaches most closely to a back detaching roller 75 at the front dead point, the feed rollers 1 and 10 also approach most closely thereto as illustrated in FIG. 7A. At the rear dead point, the space between the feed rollers 1 and 10 and the cushion plate 50 can be arranged wider as illustrated in FIG. 7B.

Generally, a nipper knife 56 is so designed that while the needles of the cylinder 70 are combing the lap of the fleece, it nips the fleece upon the cushion plate 50 as illustrated with the dotted line in FIGS. 7B, 8B, 8D, 9B, and 9D, and when the detaching rollers are detaching the combed fleece, the nipper knife is away from the cushion plate 50 and is not in a position to nip the fleece as illustrated in FIGS. 7A, 8A, 8C, 9A and 9C.

Figure 4:
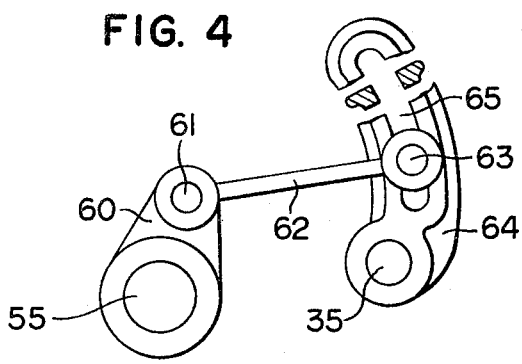
FIG. 4 is an elevational view showing a mechanism for transmitting simultaneous relative motions between the swing motion of the feed roller and the cushion plate, the said mechanism being a unique feature of the invention.

Referring to FIG. 4, a lever 60 mounted on the nipper actuating shaft 55 and a sector arm lever 64 mounted on the feed roller actuating shaft 35 are connected to each other by a connecting lever 62, one end of which is pivotally mounted on a pin 61 carried by the lever 60 and the other end pivotally mounted on a pin 63 in an arcuate slot 65 of the sector arm lever 64. Such a link motion serves as a means to connect the nipper actuating shaft 55 and the feed roller actuating shaft 35, and power is transmitted to the feed roller actuating shaft 35 through the nipper shaft 55 to cause it to oscillate.

Figure 2:
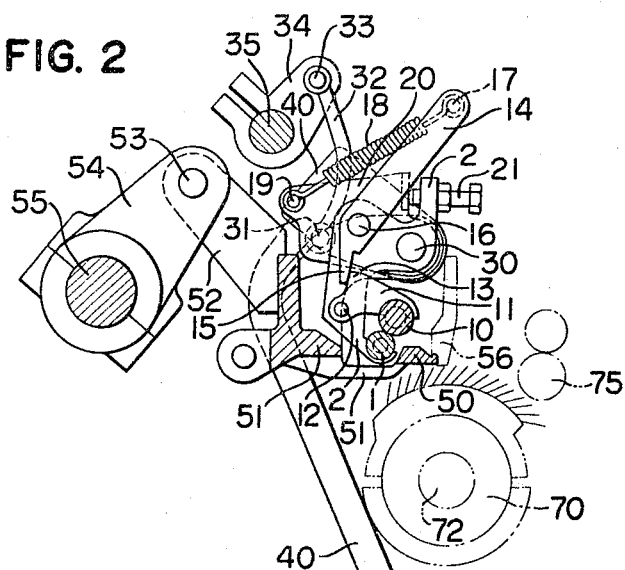
FIG. 2 is an elevational view indicating the sectional relationship between the swing mechanism of the feed roller and cushion plate which are provided with all of the main features of the invention.
Figure 3A:
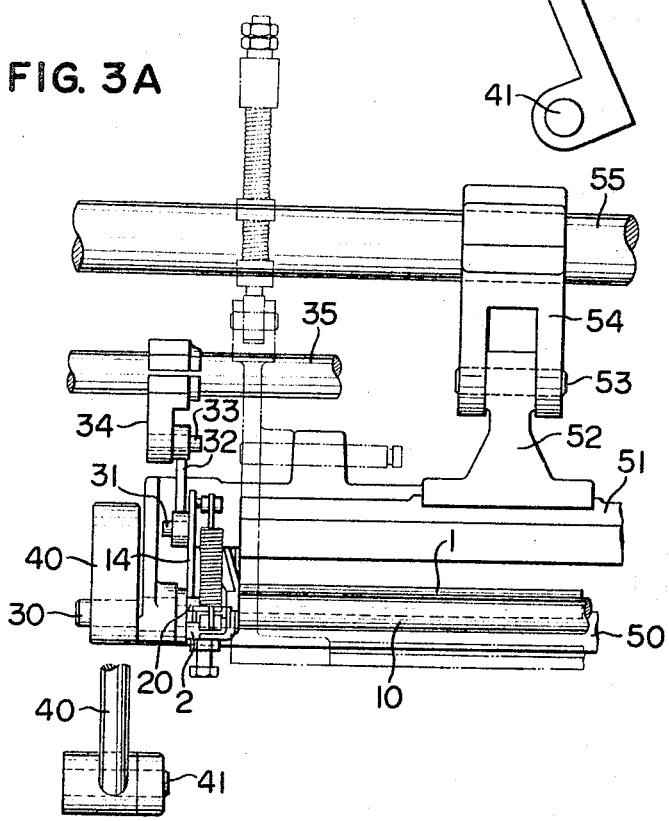
FIG. 3A is a plan view indicating the relationships among various elements of the cushion plate and feed roller of the combing head shown in FIG. 2.
Figure 3B:
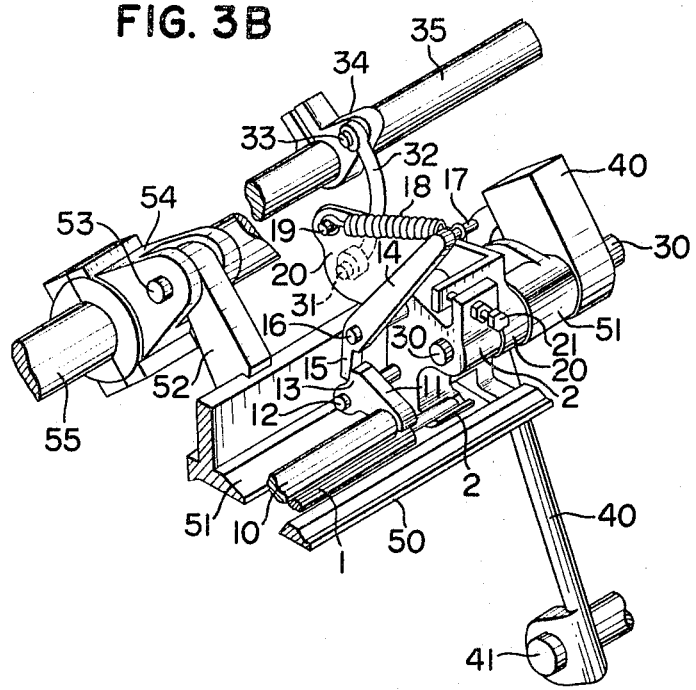
FIG. 3B is a perspective view indicating the relationship among the various elements of the cushion plate and the feed roller of the combing head shown in FIG. 2.

As shown in FIGS. 1, 2 and 4, when the nipper shaft 55 arrives at the counterclockwise dead point or when it arrives at the clockwise dead point, the feed roller actuating shaft 35 is also caused to oscillate the same as mentioned above. This means that when the cushion plate 50 arrives at the front dead point, the bottom feed roller 1 is simultaneously at the front dead point, and when the cushion plate 50 arrives at the rear dead point, the bottom feed roller 1 is simultaneously at the rear dead point. However, in order to adjust the swing amount of the feed roller 1 to be greater or lesser than that of the cushion plate 50, it is necessary to adjust the fixed position of the pin 63 in the arcuate slot 65 of the sector arm lever 64 by clamping the pin 63 in an adjusted position.

The arcuate sector slot 65 provided in the sector arm lever 64 has its center of curvature on the pin 61, which is situated at one end of the lever 60 so that, in the case of changing the position of the pin 63 in the slot 65, it is not necessary to change the position of the lever 60 against the nipper actuating shaft 55 and the position of the sector arm lever 64 against the feed roller actuating shaft 35 as illustrated in FIG. 4. This is the superior point of this special link motion according to the invention.

In a conventional comber, when the space between the front edge of the cushion plate and the back detaching roller at the front dead point is adjusted to attain the minimum space which is allowed to be derived from the construction of that comber, the space between the feed roller and the back detaching roller is inevitably fixed because the space between the feed roller and the front edge of the cushion plate is constant, and, when longer fibers are treated, the space between the feed roller and the back detaching roller must be adjusted longer, and therefore the space between the front edge of the cushion plate and the back detaching roller is adjusted longer fibers are treated, the space between the feed roller and the front edge of the cushion plate. However, the space longer than the above-mentioned minimum space imparts an undesired effect to a detaching motion and increases waste percentage. At the rear dead point, the tuft projecting from the front edge of the cushion plate is constant in length, which is usually longer than the maximum length of fibers to be combed, whereby the waste percentage of the conventional comber is usually approximately 8%.

According to the present invention, it is possible to set, at the front dead point, a desired space interval between the back detaching roller 75 and the front edge of the cushion plate 50 by adjusting the setting of the nipper oscillating arm 54 on the nipper actuating shaft 55 and also by setting a desired space interval between the back detaching roller 75 and the bottom feed roller 1 via adjusting the feed roller actuating oscillating arm 34 on the feed roller actuating shaft 35. It is also possible to set at the rear dead point a desired space interval between the front edge of the cushion plate 50 and the bottom feed roller 1 by adjusting the swing angle of the feed roller bracket 2 through the adjusting of the set position of the pin 63 located in the slot 65 of the sector arm lever 64. The length of short fibers to be combed and the waste percentage are controlled by means of adjusting the space between the front edge of the cushion plate 50 and the bottom feed roller 1. Further, it is possible to set at the front dead point the optimum relative positions of the cushion plate and the feed roller in accordance with the fiber length of the lap of fleece to be combed and also to set, at the rear dead point, the optimum relative position of the feed roller with respect to the cushion plate to limit the length of the tuft projecting from the front edge of the cushion plate to the maximum length of the fleece to be combed in the cylinder combing. Both FIGS. 9A and 9C show the conditions where the optimum relative position between the cushion plate and the feed roller has been set at the front dead point. FIG. 9B shows the conditions where the space between the feed roller and the cushion plate has been set wide for the purpose of reducing the waste percentage at the rear dead point by means of shortening the length of the tuft projecting from the front edge of the cushion plate. FIG. 9D shows, on the contrary, the conditions where the space between the feed roller and the cushion plate has been set narrow for the purpose of increasing the waste percentage at the rear dead point by means of extending the length of the tuft projecting from the front edge of the cushion plate. The combination of FIGS. 9A and 9B indicates that adjustment is made to comb the shorter fibers with less waste percentage and, on the contrary, the combination of FIGS. 9C and 9D indicates that adjustment is made to comb the longer fibers with more waste percentage. Thus, in the case of using a certain material, the waste percentage in the conventional comber was always about 8%, but, in this invention, it can be adjusted within the range of from 3% to 35% in accordance with requirement for quality of the combed sliver and the fibers to be treated.

Figure 6:
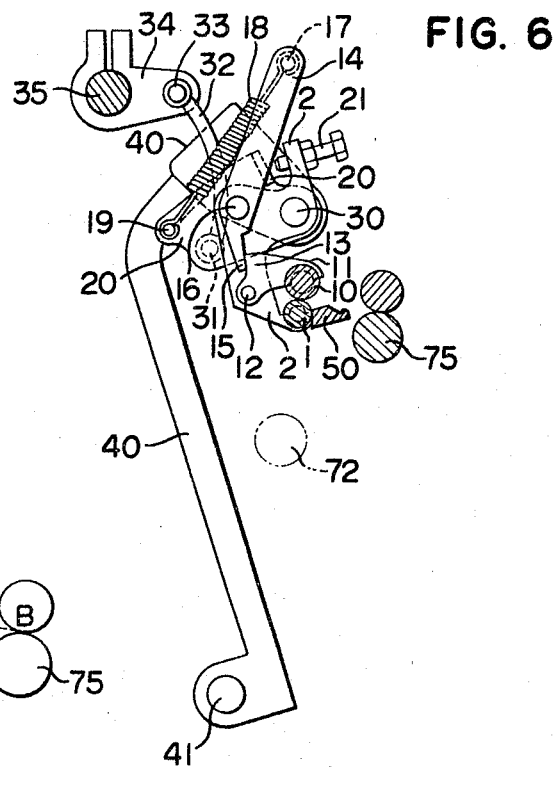
FIG. 6 is a view similar to FIG. 5, showing the state wherein a safety device is operating to prevent damage due to impact of the feed roller with the back of the cushion plate.

When such mechanism is adapted, the cushion plate 50 and the bottom feed roller 1, through any erroneous setting, may collide with each other in some cases, because the swing amount and the position of the dead point of the cushion plate 50 and the bottom feed roller 1 can be selected freely and independently. In such case, unless a safety device is provided, there is a danger of the cushion plate 50 or the feed rollers 1 and 10 being damaged. FIGS. 5 and 6 show a mechanism for eliminating such potential danger. This mechanism comprises a spring 18, the intermediate feed roller bracket 20, the spring lever 14, the integrally formed bottom end 15 of the spring lever 14, top feed roller bracket 11, feed roller bracket 2 and adjusting screw 21. One end of the spring 18 is hooked on a pin 17 which is formed on one end of the spring lever 14, and the other end is hooked on a pin 19 which is formed on one end of the intermediate feed roller bracket 20. The force of the spring 18 acts to rotate the spring lever 14 on a pin 16 counterclockwise with the result that the bottom end 15 of the spring lever 14 pushes the rear end 13 of the top feed roller bracket 11 which is pivoted on a pin 12 formed on one part of the feed roller bracket 2. As a consequence, the spring force acts to press-contact the top feed roller 10 against the bottom feed roller 1 through the media of the aforementioned components.

The force of the spring 18 also acts to rotationally oscillate the feed roller bracket 2 itself counterclockwise about the pin 30 through the aforementioned combination of the components until an adjusting screw 21 contacts the intermediate feed roller bracket 20, thereby maintaining the feed roller bracket 2 and the intermediate feed roller bracket 20 in one integral body. The feed roller actuating shaft 35 oscillates the intermediate feed roller bracket 20 through the connection of the feed roller oscillating arm 34 and the connecting arm 32 one end of which is rotatably fixed on a pin 33 on the arm 34 and the other end of which is rotatably fixed on a pin 31 formed on one part of the bracket 20, whereby the feed rollers 1 and 10 are caused to oscillate together.

When the danger of contact arises between the feed roller 1 which moves forward and the cushion plate 50, the abovementioned intermediate feed roller bracket 20 and the feed roller bracket 2 will be relieved from the contact as illustrated in FIG. 6. The intermediate feed roller bracket 20 alone will continue counterclockwise swing movement on the pivot of the pin 30, the feed roller bracket 2 will remain free from its further swing movement, and the front part of the intermediate feed roller bracket 20 moves away from the adjusting screw 21 of the feed roller bracket 2 by the oscillation of the feed roller actuating shaft 35. The spring 18 absorbs the further counterclockwise swing movement of the feed roller bracket 2. In the means connecting the feed roller actuating shaft 35 and the bottom feed roller 1, the connecting mechanism including a spring acts as a safety device. The spring 18 acts to press the top feed roller 10 upon the bottom feed roller 1 to combine the intermediate feed roller bracket 20 and the feed roller bracket 2 as one integral body, and simultaneously acts as a safety device to avoid damage of the cushion plate 50 or the feed rollers 1 and 10 due to collision.

Although this invention has been described with respect to a preferred embodiment thereof, it is not to be so limited as changes and modifications can be made therein which are within the full intended scope of the invention as defined by the appended claims.

What is claimed is:

1. An independent swing motion mechanism for cushion plate and feed rollers of a cotton combing machine of a type having a combing cylinder, comprising a nipper body, a nipper actuating shaft, means for oscillating said nipper actuating shaft, means for connecting the nipper actuating shaft and the nipper body, a feed roller actuating shaft, a feed roller bracket unit, means for connecting the nipper actuating shaft to the feed roller actuating shaft for oscillating said feed roller actuating shaft, means for connecting the feed roller actuating shaft and the feed roller bracket unit, a nipper swing arm, and means for holding the feed roller bracket unit, swing arm and nipper body including a common pin and providing a common center for pivotal movement of the nipper body, swing arm and feed roller about the common center and for swinging the same over the combing cylinder.

2. The mechanism as claimed in claim 1 wherein said means for connecting the nipper actuating shaft and feed roller actuating shaft includes a sector arm lever fixed on the feed roller actuating shaft, said sector arm lever having an arcuate slot therein, a lever fixed on the nipper actuating shaft, and a connecting lever pivotally connected to the sector arm lever and the fixed lever on the nipper actuating shaft with the connecting lever being adjustably fixed in the arcuate slot of the sector arm lever and the slot being formed on a radius about the pivotal connection between the connecting lever and the fixed lever on the nipper actuating shaft.

3. The mechanism as claimed in claim 1 wherein said means for connecting the feed roller actuating shaft and the feed roller bracket unit for pivotal movement of the feed rollers includes a first feed roller bracket means and an intermediate feed roller bracket means mounted on the axis serving as a common center of the nipper body and swing arm for independent pivotal movement about such common axis, and means for coupling the first feed roller bracket means with the intermediate feed roller bracket means, said coupling means including a lever pivoted adjacent one end to the first feed roller bracket means, means on said first feed roller bracket means engaging said one end of said lever, a spring connected to the other end of said lever and means connecting said spring to the intermediate feed roller bracket means whereby said first feed roller bracket means and intermediate feed roller bracket means rotate around the common center as a unitary structure.

References Cited by the Examiner

FOREIGN PATENTS 143,650   6/1920   Great Britain.

ROBERT R. MACKEY, *Primary Examiner.*

MERVIN STEIN, DORSEY NEWTON, *Examiners.*